United States Patent [19]
George

[11] Patent Number: 4,538,274
[45] Date of Patent: Aug. 27, 1985

[54] Q-SWITCHED RAMAN LASER SYSTEM

[75] Inventor: E. Victor George, Livermore, Calif.

[73] Assignee: The United States of America as represented by the United States Department of Energy, Washington, D.C.

[21] Appl. No.: 455,445

[22] Filed: Jan. 4, 1983

[51] Int. Cl.³ .............................................. H01S 3/00
[52] U.S. Cl. .......................................... 372/3; 372/11
[58] Field of Search .......................... 372/3, 71, 10, 11

[56] References Cited

U.S. PATENT DOCUMENTS 3,500,230  3/1970  Kafalas .................................. 372/11
3,521,069  7/1970  De Maria et al. ..................... 372/11

Primary Examiner—William L. Sikes
Assistant Examiner—Robert E. Wise
Attorney, Agent, or Firm—John F. Schipper; Clifton E. Clouse, Jr.; Judson R. Hightower

[57] ABSTRACT

Method and apparatus for use of a Raman or Brillouin switch together with a conventional laser and a saturable absorber that is rapidly bleached at a predetermined frequency $\nu = \nu_0$, to ultimately produce a Raman or Brillouin pulse at frequency $\nu = \nu_0 \pm \nu_{Stokes}$.

9 Claims, 5 Drawing Figures

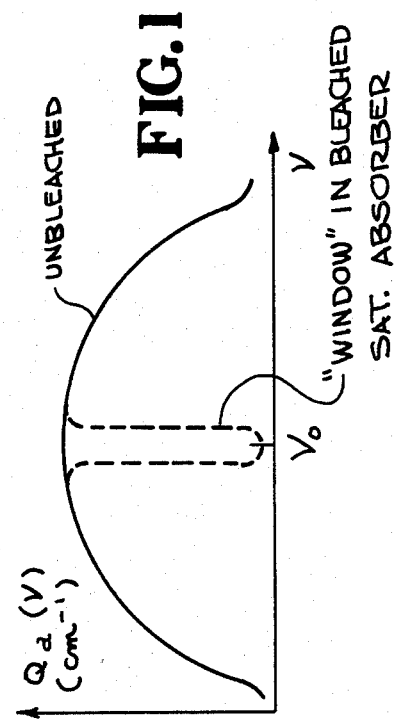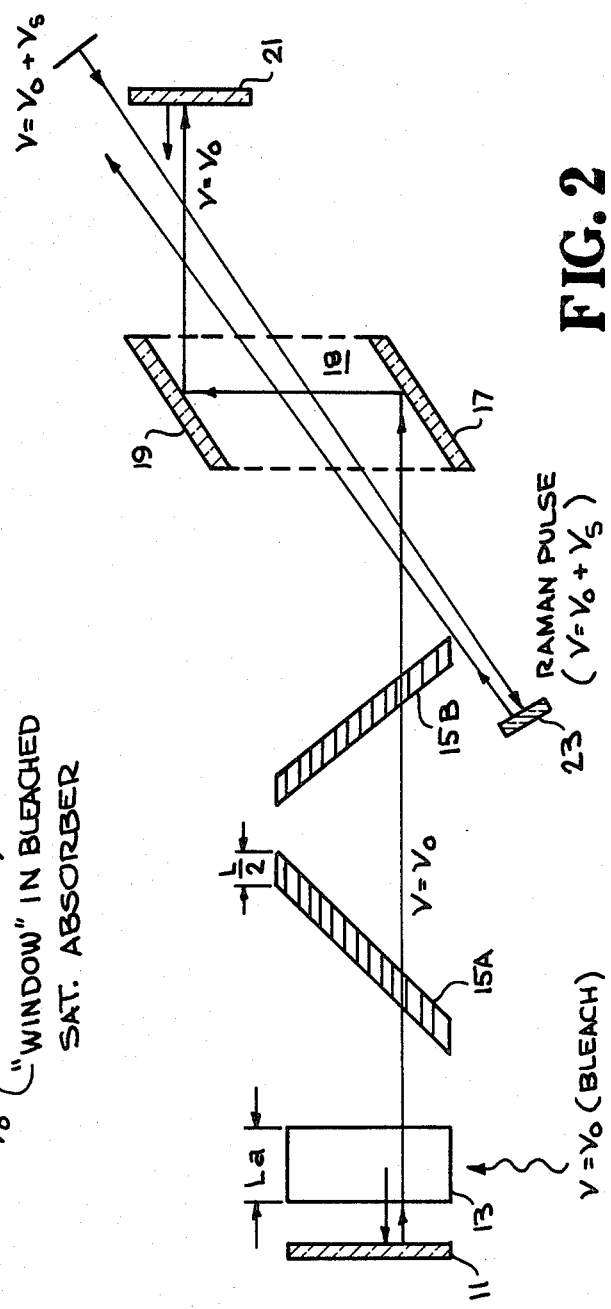

Q-SWITCHED RAMAN LASER SYSTEM

The U.S. Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to laser pulse amplification apparatus, using Raman scattering.

BACKGROUND OF THE INVENTION

Techniques of Q-switching by particular methods, whereby optical amplification of a laser pulse is delayed until the energy field density in the laser optical cavity is sufficiently high to produce rapid energy build-up of the amplified pulse, have been discussed in the literature for many years; but no technique has yet been proposed for Q-switching using Raman scattering for energy extraction from the optical cavity.

SUMMARY OF THE INVENTION

The invention is a method and apparatus for Q-switching a laser pulse out of an optical cavity, using subsequent bleaching of a saturable absorber to delay onset of rapid pulse amplification and using Raman scattering in a Raman cell to temporarily store and switch out most of the energy in the cavity.

One object of the invention is to provide method and apparatus for switching an amplified laser pulse out of an optical cavity.

Another object is to provide method and apparatus for controllably delaying the onset of rapid laser pulse amplification in an optical cavity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing objects in accordance with the invention, the method comprises the steps of providing an optical cavity, including two substantially perfectly reflecting end mirrors, and a Raman cell, an energy storage laser amplifier and a saturable absorber within the optical cavity, with the broadband saturable absorber in its unbleached state being of sufficient length to substantially fully attenuate any radiation amplification produced by one or two passes of a laser pulse through the energy storage laser amplifier; introducing a small intensity pulse of predetermined frequency $\nu = \nu_0$ into the optical cavity and causing this pulse to propagate two or more times through the energy storage laser amplifier, the Raman cell and the saturable absorber; introducing a bleaching pulse centered at frequency $\nu = \nu_0$ into the saturable absorber so that the saturable absorber becomes substantially transparent to radiation of frequency $\nu = \nu_0$; and shortly after introducing the bleaching pulse, propagating a Raman pulse of predetermined frequency $\nu = \nu_0 + \nu_S$ through the Raman cell in timed relationship with a counter-propagating pulse produced by the energy storage laser amplifier itself.

BRIEF DESCRIPTION OF THE DRAWINGS

The accompanying drawings, which are incorporated and form a part of the specification, illustrate an embodiment of the invention and, together with the description, serve to explain the principles of the invention.

FIG. 1 is a graphic view of radiation absorption per unit length of a typical saturable absorber as a function of frequency, with the absorber in its unbleached and bleached condition.

FIG. 2 is a schematic view of one embodiment of the invention, using a saturable absorber that is adjacent to but spaced apart from one optical cavity end mirror.

DETAILED DESCRIPTION OF A PREFERRED EMBODIMENT

A saturable absorber, an energy storage laser amplifier and an inelastic scattering cell which changes light frequency such as a Raman or Brillouin cell are combined to (1) controllably delay the onset of laser pulse amplification in an optical cavity while the optical energy density builds to a high, predetermined value, and (2) allow switchout of the amplified pulse energy at a suitably shifted frequency. As used herein, a "Raman cell" is a closed container having a Raman active gas (e.g., $CH_4$) contained therein and having two opposing end walls that are substantially fully reflecting for radiation of a predetermined pump frequency (here denoted $\nu_0$) and having at least one cell side wall that is substantially transparent to radiation of a second, predetermined frequency $\nu = \nu_0 + \Delta\nu$. Brillouin scattering is defined as the scattering of light by acoustic phonons. Propagation of substantially monochromatic radiation of frequency, say $\nu = \nu_0$ above a threshold power density in a Raman active gas gives rise to stimulated Raman scattering at a series of frequencies $\nu = \nu_0 \pm \nu_1$, $\nu_0 \pm \nu_2, \ldots$, called Stokes frequencies, where the frequency shifts $|\Delta\nu| = \nu_1 < \nu_2 < \ldots$ are usually small fractions of the central frequency $\nu = \nu_0$ (the Rayleigh line) and manifest the effects of molecular vibrations of the Raman-active gas. Hydrogen gas ($H_2$) and other low atomic weight molecular gases such as $CH_4$, $CS_2$, etc. have large vibrational shifts, but gases having narrow line widths at these shifted frequencies are preferred for Raman scattering. The Raman scattered radiation can be a Stokes line ($\Delta\nu = -\nu_1, -\nu_2, \ldots$) or an anti-Stokes line ($\Delta\nu = +\nu_1, +\nu_2, \ldots$) depending upon whether the particular molecular vibration of the gas absorbs energy ($\Delta\nu > 0$) or gives up energy ($\Delta\nu < 0$) as it scatters the incident radiation.

A broadband saturable absorber having absorptivity per unit length $NQ_A$ (N=atomic numerical density of absorber, $Q_A$=absorber cross-sectional area) of a representative form shown in FIG. 1, can be used to delay or control the buildup of laser transitions in an optical cavity. At some predetermined time $t = t_0$, the saturable absorber is bleached by an optical pulse of predetermined frequency $\nu = \nu_0$ so that a "window" is burned in the absorption curve at frequencies centered at $\nu = \nu_0$, thus rendering the saturable absorber substantially transparent at such frequencies. This "Q-switching" approach is used in an optical cavity in conjunction with the Raman switch to produce a controllable pulse of predetermined frequency, $\nu=\nu_0-\nu_{Stokes}$ at a later time.

Figure 3:
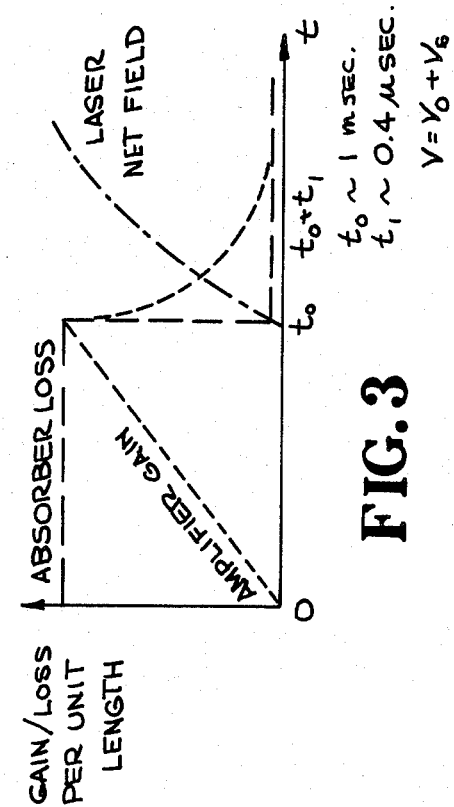
FIGS. 3 and 5 are graphic views of saturable absorber loss and amplifier optical energy as a function of time.

The apparatus is shown in one embodiment in FIG. 2. The optical cavity is defined by the fully reflecting mirrors 11 and 21 (at frequency $\nu=\nu_0$) and the intermediate redirecting mirrors 17 and 19 that define a subsidiary inelastic light-scattering cell to change the frequency, such as a Raman or Brillouin cell 18 within the optical cavity. The saturable absorber 13 of length $L_A$, is placed adjacent to the mirror 11, and a more-or-less conventional solid state laser having two or more discs 15A and 15B is placed between the saturable absorber 13 and the Raman cell 18. A Raman cell is preferred. The solid state amplifier (e.g., Nd:glass or atomic iodine or any other medium with a radiative lifetime exceeding a few microseconds) is pumped for times of order 1 millisecond and stores this energy before radiative/non-radiative decay for $\pi_{rad}\lesssim 200$ μsec. Optical energy of frequencies $\nu=\nu_0$ within the optical cavity propagates back and forth between the mirrors 11 and 21. If the gain in the optical cavity (ignoring the presence of the saturable absorber) is $\alpha L$ ($\approx 1-5$), where L is the effective length of the gain region, the length $L_A$ of the saturable absorber is chosen so that $NQ_AL_A\gtrsim\alpha L$ so that all of the associated amplifier gain is removed on each pass by the unbleached saturable absorber. Prior to the time $t=t_0$ that the absorber switching pulse is introduced, the absorber loss is constant, and the amplifier gain per unit length builds slowly and approximately linearly as shown in FIG. 3. At $t=t_0$, a bleach pulse is applied to the saturable absorber and the absorber becomes substantially transparent at frequencies near $\nu=\nu_0$ so that the absorber loss falls nearly to 0 as indicated in FIG. 3. For $t<t_0$, the net gain $G_{net}=\alpha L-NQ_AL_A\lesssim 0$ so that no net (round trip) laser gain is manifest; for $t>t_0$, the net gain $G_{net}\approx\alpha L$ as a result of the bleaching wave action. For $t>t_0$, the laser optical field within the cavity between the absorber 13 and the mirror 21 (FIG. 2) builds at a rate $\approx e^{\alpha L}$ per pass so that after about 10 passes ($t=t_0+t_1$) the field is near the optimum value ($\alpha L\Gamma_s\approx 10-30$ J/cm$^2$, where $\Gamma_s$ is saturation fluence of the laser medium). The optical energy contained in the cavity between the mirrors 11 and 21 is then extracted by means of a Raman counter-propagating radiation field of frequency $\nu=\nu_0-\nu_{Stokes}$, passed (twice) through the Raman cell 18 as shown in FIG. 2 by reflection from a mirror 23. The energy remaining in the cell 18 after extraction of energy by the Raman pulse serves as a seed pulse for another pass through the amplifiers 15A and 15B, for the Raman accumulator, and this remaining energy is extended with a second pass of the switch-out pulse. The mirror 23 can also be made part of one side wall of the Raman cell 18 so that only one wall of 18 need be substantially transparent at the frequency $\nu=\nu_0\pm\nu_S$.

The saturable absorber can be a gas such as He$^-$ ($Q_A\approx 10^{-16}$ cm$^2$, $L_A\approx 1$ cm, $N\approx 3\times 10^{16}$ cm$^{-3}$), or the absorber cell 13 can be replaced by a solid coating of CaO on the mirror 11 ($L_A\approx 1$ μm, $Q_A\approx 10^{-16}$ cm$^2$, $N\approx 3\times 10^{20}$ cm$^{-3}$), in achieving $NQ_AL_A\approx 1-5$. The bleach pulse at $\nu=\nu_0$, used to irradiate the absorption cell 13 at $t=t_0$, has an intensity $I_{switch}\approx 0.001$ $I_{laser}$ so that relatively little energy is expended in Q-switching the cavity. However, the bleach pulse must be applied each time another Raman switched out pulse is produced. A pulse (switchout) repetition rate as high as $10^5$ sec$^{-1}$ is achievable, limited primarily by the radiative lifetime of the excited medium ($\approx 1-200$ μsec). Gaseous He$^-$ exhibits homogeneous broadening, which is suitable for implementing the narrowband window shown in FIG. 1. A (solid density) coating of CaO exhibits strong absorption bands at the frequency of interest.

Figure 4:
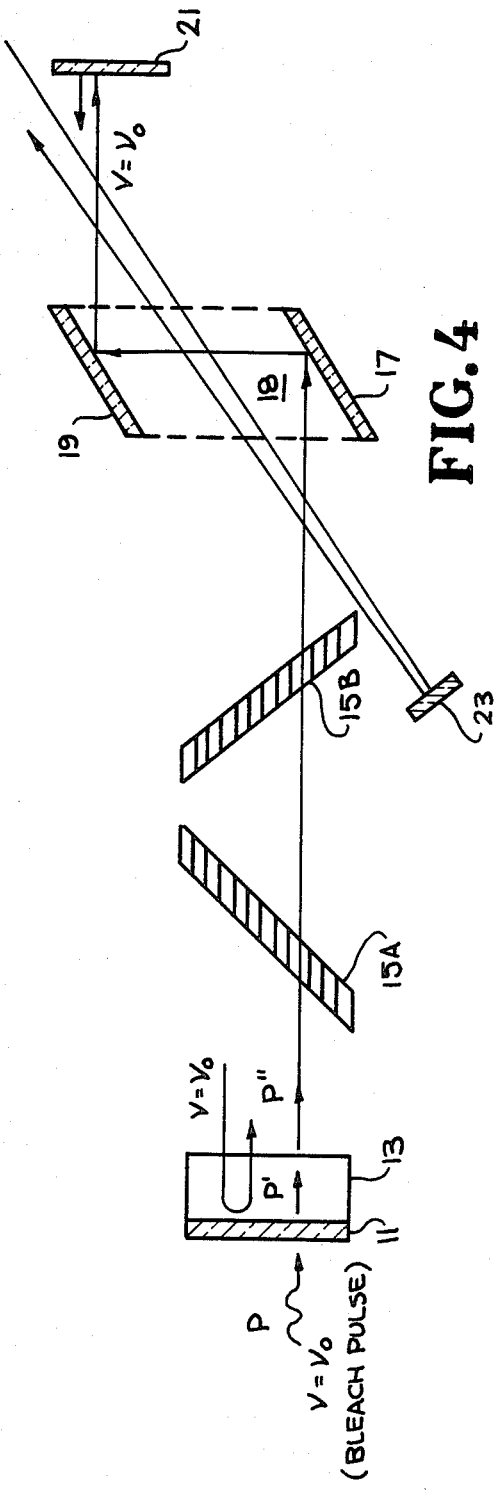
FIG. 4 is a schematic view of a second embodiment of the invention, wherein the absorber bleach pulse is introduced through an optical cavity end mirror that is partially transmissive at a predetermined frequency $\nu = \nu_0$.

A second embodiment of the invention, shown in FIG. 4, positions the absorber cell 13 contiguous to the reflector 11 and replaces the substantially 100% reflector 11 by a partially transmissive (transmissivity $\approx 1\%$) reflector 11" that transmits at frequencies $\nu\approx\nu_0$. The bleaching or absorber switching pulse P, introduced through the partially transmissive reflector 11' as shown, passes through the reflector 11' to become a pulse P' of reduced intensity ($\approx 1\%$ of P intensity). The pulse P' then bleaches the absorber as indicated in FIG. 1 and a seed pulse P'' of further-reduced intensity issues from the absorber cell 13, to be amplified by passage through the energy storage amplifier 15. As the amplified pulse P'' returns to the absorber cell 13, the pulse is not appreciably absorbed by the now-bleached absorber medium in the frequency region $\nu=\nu_0$; and the pulse passes through the cell 13, is 99% reflected at the reflector 11', and passes back through the cell 13 for another cycle. On successive passes of the pulse P'' through the energy storage amplifier 15, the associated pulse energy increases approximately geometrically (small signal gain); and this energy is reduced only a small amount by sequential passages through the (now-bleached) absorber cell 13. After the amplified pulse P'' has nearly saturated, at which point small signal gain theory is no longer applicable and the small optical and absorber losses are no longer ignorable, the amplified pulse P'' is switched out of the cavity by a counter-propagating optical field in the Raman cell 18 as before.

Figure 5:
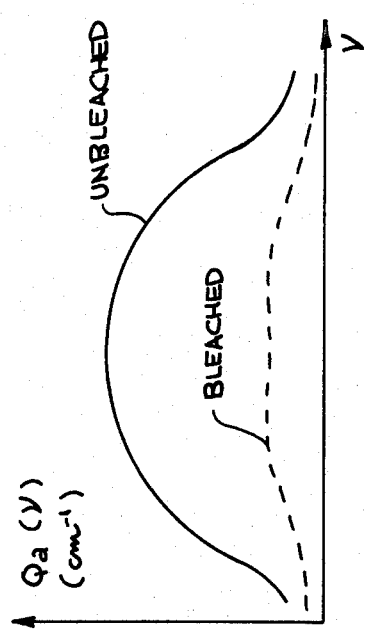

A third embodiment of the invention uses thallium-doped alkali halide as the saturable absorber, Nd:glass for the amplifier medium and CH$_4$ for the Raman switch material. The output is at $\nu=1.6$ μm with a Raman shift of 2914 cm$^{-1}$. In this embodiment, the inhomogeneous absorption, QA$^{(\nu)}$, of the saturable absorber shown in FIG. 1 is replaced by a more homogeneous abosrption such as shown in FIG. 5 (characteristic of Th-doped alkali halide). One modest disadvantage of this embodiment, vis-a-vis the embodiment(s) using absorbers illustrated in FIG. 1, is that other frequencies far removed from the central frequency $\nu=\nu_0$ will also be transmitted through the bleached absorber. However, this can be controlled by careful frequency tailoring of the seed pulse at $\nu=\nu_0$ and suppression of parasitics.

The foregoing description of preferred embodiments of the invention has been presented for purposes of illustration and description. It is not intended to be exhaustive or to limit the invention to the precise form disclosed, and obviously many modifications and variations are possible in the light of the above teaching. The embodiment is chosen and described in order to best explain the principles of the invention and its practical application, to thereby enable others skilled in the art to best utilize the invention in various embodiments, and with various modifications that are suited to the particular use contemplated. It is intended that the scope of the invention be defined by the claims appended hereto.

I claim:

1. A method for producing a pulse of laser radiation of frequency $\nu=\nu_0+\Delta\nu_S$, the method comprising the steps of:

providing an optical cavity including two end mirrors, with a Raman cell, an energy storage laser amplifier and a saturable absorber therebetween, with the saturable absorber being positioned adjacent to one optical cavity end mirror, with the absorber density N, the length of the saturable absorber $L_A$, the absorber cross-sectional area $Q_A$, the effective amplifier gain length L and the amplifier gain per unit length $\alpha L$ satisfying $NQ_AL_A \gtrsim \alpha L$;

introducing into the Raman cell a Raman-active gas that is excited by passage therethrough of radiation of frequency $\nu = \nu_0$ and that emits radiation at the first Stokes or anti-Stokes frequency $\nu = \nu_0 + \Delta \nu_S$ corresponding to excitation at frequency $\nu = \nu_0$;

introducing a small intensity pulse of predetermined frequency $\nu = \nu_0$ into the optical cavity and causing the pulse to propagate two or more times through the energy storage laser amplifier, the Raman cell, and the saturable absorber;

introducing a bleaching pulse centered at frequency $\nu = \nu_0$ into the saturable absorber so that the absorber becomes substantially transparent to radiation of frequency $\nu = \nu_0$;

shortly after introduction of the bleaching pulse, propagating a Raman pulse of predetermined frequency $\nu = \nu_0 + \Delta \nu_S$ through the Raman cell in timed relationship with a counterpropagating pulse produced by the amplifier itself, whereby a high intensity pulse of frequency $\nu = \nu_0 + \Delta \nu_S$ issues from the Raman cell.

2. The method according to claim 1, further including the step of providing He gas having atomic numerical density of substantially $N = 3 \times 10^{16}$ cm$^{-3}$ and absorber length substantially $L_A = 1$ cm as said saturable absorber.

3. A method according to claim 1, further including the step of providing a solid coating of CaO on said first optical cavity end mirror as said saturable absorber, with the CaO having atomic numerical density substantially $N = 3 \times 10^{20}$ cm$^{-3}$ and absorber length substantially $L_A = 1$ μm.

4. A method according to claim 1, further including the step of providing a Th-doped alkali halide gas having atomic numerical density of substantially $N = 3 \times 10^{16}$ cm$^{-3}$ and absorber length $L_A = 1$ cm as said saturable absorber.

5. Apparatus for producing a pulse of laser radiation of frequency $\nu = \nu_0 + \Delta \nu_S$, the apparatus comprising:

an optical cavity bounded by two end mirrors substantially parallel and facing one another, at least one of which is substantially 100% reflecting at a predetermined frequency $\nu = \nu_0$;

a broadband saturable absorber positioned within the optical cavity and adjacent to one of the end mirrors;

an energy storage laser amplifier, positioned within the optical cavity between the saturable absorber and the second end mirror, the amplifier being capable of amplifying radiation of frequency $\nu = \nu_0$;

a Raman cell having at least two sidewalls, positioned in the optical cavity between the saturable absorber and the second end mirror, and containing a Raman-active gas that is excited by passage therethrough of radiation of frequency $\nu = \nu_0$ and emits that radiation at the first Stokes or anti-Stokes frequency $\nu = \nu_0 + \Delta \nu_S$ corresponding to excitation at frequency $\nu = \nu_0$, the cell having at least one sidewall that is substantially transparent to radiation of frequency $\nu = \nu_0 + \Delta \nu_S$;

seed pulse means to produce and introduce a radiation pulse of frequency $\nu = \nu_0$ into the optical cavity so that this pulse propagates from one cavity end mirror to the other cavity end mirror;

Stokes pulse means, positioned adjacent to the Raman cell to produce a radiation pulse of frequency $\nu = \nu_0 + \Delta \nu_S$ and to direct this pulse through at least one Raman cell transparent sidewall in timed relationship with passage of the radiation pulse of frequency $\nu = \nu_0$ through the Raman cell; and a mirror that is substantially fully reflecting to incident radiation at frequency $\nu = \nu_0 + \Delta \nu_S$, positioned adjacent to one of the transparent sidewalls of the Raman cell so that radiation from the radiation source passes through the Raman cell once, is reflected at perpendicular incidence by this mirror and passes through the Raman cell a second time.

6. Apparatus according to claim 5, wherein said two optical cavity end mirrors are not axially aligned relative to one another and said Raman cell has two endwalls, each endwall having an endwall mirror, with the two Raman cell endwall mirrors being parallel to one another and being oriented so that a radiation pulse that is perpendicularly incident upon one of said optical cavity end mirrors will be serially reflected thereat, reflected by one of the Raman cell endwall mirrors, reflected by the second Raman cell endwall mirror and proceed toward said second optical cavity end mirror at perpendicular incidence.

7. Apparatus according to claim 6, wherein said saturable absorber includes He gas having atomic numerical density of substantially $N = 3 \times 10^{16}$ cm$^{-3}$ and absorber length substantially $L_A = 1$ cm.

8. Apparatus according to claim 6, wherein said saturable absorber includes a solid coating of CaO on said first optical cavity end mirror, with the CaO having atomic numerical density substantially $N = 3 \times 10^{20}$ cm$^{-3}$ and absorber length substantially $L_A = 1$ m.

9. Apparatus according to claim 6, wherein said saturable absorber includes a Th-doped alkali halide gas having atomic numerical density of substantially $N = 3 \times 10^{16}$ cm$^{-3}$ and absorber length substantially $L_A = 1$ cm.

* * * * *